(12) United States Patent
Hufnagel (10) Patent No.: US 10,684,600 B2
(45) Date of Patent: Jun. 16, 2020

(54) METHOD FOR OPERATING A CONTROL DEVICE AND FOR EXTERNAL BYPASSING OF A CONFIGURED CONTROL DEVICE

(71) Applicant: DSPACE DIGITAL SIGNAL PROCESSING AND CONTROL ENGINEERING GMBH, Paderborn (DE)

(72) Inventor: Thorsten Hufnagel, Salzkotten (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 79 days.

(21) Appl. No.: 15/774,607

(22) PCT Filed: Aug. 11, 2016

(86) PCT No.: PCT/EP2016/069161
§ 371 (c)(1),
(2) Date: May 9, 2018

(87) PCT Pub. No.: WO2017/084779
PCT Pub. Date: May 26, 2017

(65) Prior Publication Data
US 2018/0321655 A1    Nov. 8, 2018

(30) Foreign Application Priority Data

Nov. 19, 2015 (DE) .................. 10 2015 120 054

(51) Int. Cl.
*G06F 9/44* (2018.01)
*G05B 19/042* (2006.01)
*G06F 9/445* (2018.01)

(52) U.S. Cl.
CPC ..... *G05B 19/0426* (2013.01); *G06F 9/44505* (2013.01); *G05B 2219/21012* (2013.01);
(Continued)

(58) Field of Classification Search
None
See application file for complete search history.

(56) References Cited

U.S. PATENT DOCUMENTS 6,260,157 B1 * 7/2001 Schurecht .................. G06F 8/66
 711/202
9,471,197 B2 * 10/2016 Joo ........................ G06F 3/0488
(Continued)

FOREIGN PATENT DOCUMENTS

DE         10228610 A1    1/2003
DE         10235610 A1    2/2004
(Continued)

*Primary Examiner* — Qamrun Nahar
(74) *Attorney, Agent, or Firm* — Leydig, Voit & Mayer, Ltd.

(57) ABSTRACT

A method for operating a controller is provided. Program code having internal controller functions is stored on the controller, the program code being equipped with at least one service function. A service configuration for the at least one service function is provided on the controller. The method includes; detecting, in the controller, the service configuration; and executing a service functionality in accordance with the service configuration when the at least one service function is invoked. The service configuration denotes at least one internal controller function which is executed as a service functionality of the corresponding at least one service function. The at least one service function, via the service configuration, provides at least one value for at least one argument of the at least one internal controller function in the controller and/or receives at least one return value of the at least one internal controller function.

16 Claims, 4 Drawing Sheets

(52) U.S. Cl.
CPC .............. *G05B 2219/23328* (2013.01); *G05B 2219/2637* (2013.01)

(56) References Cited

U.S. PATENT DOCUMENTS

2008/0065239 A1    3/2008    Leinfellner et al.
2015/0160940 A1    6/2015    Hufnagel et al.

FOREIGN PATENT DOCUMENTS

EP            1876525 A1    1/2008
EP            2881858 A1    6/2015
WO    WO 2005091089 A1    9/2005

* cited by examiner

METHOD FOR OPERATING A CONTROL DEVICE AND FOR EXTERNAL BYPASSING OF A CONFIGURED CONTROL DEVICE

CROSS-REFERENCE TO RELATED APPLICATIONS

This application is a U.S. National Phase application under 35 U.S.C. § 371 of International Application No. PCT/EP2016/069161, filed on Aug. 11, 2016, and claims benefit to German Patent Application No. DE 10 2015 120 054.6, filed on Nov. 19, 2015. The International Application was published in German on May 26, 2017 as WO 2017/084779 A1 under PCT Article 21(2).

FIELD

The invention relates to a method for operating a controller, program code having internal controller functions being stored on the controller, the program code being equipped with at least one service function. The invention further relates to a controller set up for external bypassing.

BACKGROUND

DE 102 28 610 A1 discloses a method for verifying a control program running on an electronic arithmetic-logic unit, in which method at least one bypass function is coupled to specified interfaces by means of dynamic links. A bypass routine loaded into the memory of the electronic arithmetic-logic unit has read access to statically available data.

EP 2 881 858 A1 discloses a method for changing the software in the memory of an electronic controller, in which method a bypass routine is filed in the main memory of the controller and the memory address is stored in a table. A service function reads out the address from the table and invokes the bypass routine. By deleting the table entry, the bypass routine can be exchanged at the runtime of the controller. The information about the variables processed by the program routine comes from a technical description file which contains, inter alia, the memory addresses of the variables.

SUMMARY

In an exemplary embodiment, the present invention provides a method for operating a controller. Program code having internal controller functions is stored on the controller, the program code being equipped with at least one service function. A service configuration for the at least one service function is provided on the controller. The method includes: detecting, in the controller, the service configuration; and executing a service functionality in accordance with the service configuration when the at least one service function is invoked. The service configuration denotes at least one internal controller function which is executed as a service functionality of the corresponding at least one service function. The at least one service function, via the service configuration, provides at least one value for at least one argument of the at least one internal controller function in the controller and/or receives at least one return value of the at least one internal controller function.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the invention relate overall to the handling and influencing of controllers in controller development, specifically controller development within the context of rapid control prototyping (RCP), in which (series) controllers having permanently implemented internal controller functions are used. The internal controller functions are a component of the program code saved on the controller, the program generally being an executable compiled program. Although it is also conceivable for the program code to be available in high-level language form and interpreted, this is contrary to the generally existing speed requirements owing to the real-time operation of a controller.

In the context of the controller development under consideration in this case, one or more of said internal controller functions are completely bypassed, expanded or more generally manipulated in a specific manner; methodically it is thus what is referred to as bypassing. Said controller development method in the context of rapid control prototyping differs from the "fullpass" method in which a controller is completely replaced by a powerful development hardware having I/O interfaces. Said development hardware is not used later in conjunction with the technical process to be influenced, but rather is replaced by a specifically customized—and generally significantly less expensive—controller after the development work has been completed.

The application scenario under consideration in this case includes the controller being connected to a technical process via an I/O interface, the controller outputting control signals to the technical process via the I/O interface and receiving state variables of the technical process as signals via the I/O interface when the program code stored (i.e. saved) on the controller is executed. During rapid control prototyping by bypassing, the controller is still used in the technical process to be influenced and to be monitored and is functionally influenced by the bypassing. For this purpose, the controller is typically connected to an influencing device via an additional interface. Said additional interface usually differs from the I/O interface of the controller via which the controller is connected to the technical process. Via said influencing interface, it is possible, by purposely reading out memory cells from the controller into the influencing device and by writing values calculated on the influencing device into the memory of the controller, to bypass controller functions, calculate new functions on the influencing device and thus purposely influence the controller via these bypass operations.

The write access to the memory of the controller, via which only parameters or sets of parameters, i.e. characteristics, characteristic curves or characteristic maps, used by the internal controller functions are changed, is often referred to as controller application. If not only parameters of internal functions of the controller, i.e. data filed in the memory of the controller, but also the internal functions implemented in the controller themselves, are intended to be changed for test purposes, function bypassing is used, in which the controller signals, to a connected, real-time-capable influencing device, the invocation of an internal controller function; however, the controller does not execute the function itself, but rather only receives and further uses the result of the function calculated, as a replacement, on the influencing device; in this manner, the controller function is bypassed.

In the two scenarios (controller application and function bypassing) described above, special access to the controller is provided in the form of the already mentioned bypass interface, via which it is possible to monitor and actively influence the controller. It is known in the prior art, for example, to use a parallel interface for intervening in the hardware of the controller, via which interface the influencing device works in the manner of a memory emulator. The influencing device is received by an adapter, which takes the place of a memory chip of the controller, or by a slot specially provided therefor in the printed circuit board of the controller, and can thus access the address and data bus of the controller microcontroller. In that case, the influencing device itself contains a dual port memory (DPMEM) as a central element. The dual port memory can now be read and written by the influencing device, it being possible for the controller microcontroller to automatically read the data filed in the dual port memory of the influencing device, since the dual port memory is located in the address space of the microcontroller owing to the coupling to the data and address bus of the controller microcontroller.

In other solutions, data exchange between the controller and the influencing device is implemented via what are known as debug interfaces of the controller, which, in modern microcontrollers (e.g. Nexus, JTAG), are already integrated on the chip. Irrespective of the hardware access to the controller, the controller is prepared, in terms of software, for a possible application of bypassing; this is done by providing service functions specifically intended for bypassing in the program code of the controller, meaning that the program code is thus equipped with said service functions. Said service functions are often at the start and at the end of a controller function of interest, and can be hard-coded or can have a certain flexibility such that they can be activated and deactivated. The service functions copy, for example, arguments of internal controller functions into the DPMEM, in order to make said arguments available therefrom to a connected influencing device which reads out said values and supplies them to a functionality that is implemented on the influencing device. The result of the calculation on the influencing device is then re-written, vice versa, into the DPMEM and used as a result for the bypassed internal controller function for the additional internal calculation on the controller.

In the context of bypassing, it is not possible using the mechanisms described in the prior art to purposely access controller-internal functions. This is temporarily solved by said internal functions being cyclically invoked in the program code of the controller and the function arguments or return values then being transported via global variables. However, in the program code of the controller, this forces, for every function and for every possibly desired invocation position of said internal controller function, a specific adaptation of the controller program code, which is associated with considerable drawbacks with respect to the size of the program code and also with respect to the influence on the runtime behavior of the program code in the controller.

Exemplary embodiments of the present invention provide a method for operating a controller via which it is possible, in a flexible manner, to flexibly invoke even internal controller functions during external bypassing.

In an exemplary embodiment, the present invention provides a method for operating a controller as described at the outset, by a service configuration for the service function being provided on the controller, by the service configuration being detected in the controller, and by a service functionality being executed in accordance with the service configuration when the service function is invoked, the service configuration denoting at least one internal controller function which is executed as a service functionality of the corresponding service function. The service function is set up, via the service configuration, to provide at least one value for at least one argument of the internal controller function in the controller and/or to receive at least one return value of the internal controller function.

Via these method steps, it is possible for any service function to invoke any internal controller function in a very simple and elegant manner. The assignment as to which service function invokes which internal controller function, or even a plurality of controller functions, is contained in the service configuration. The service function and/or the service configuration expediently contain an executable code, via which it is possible to transfer the arguments and/or return values at the runtime.

An internal controller function is understood here to mean those routines of the original program code of which the invocation requires one or more arguments to be passed, and/or which routines output one or more return values. For example, these may be set functions which receive one or more arguments and, using the values passed, modify one or more parameters of the program code, without the address of the particular parameter needing to be known. Another example is that of get functions, which provide one or more return values when invoked, such as in particular an instantaneous sensor signal. In principle, internal controller functions can both require at least one argument and provide at least one return value. In this case, the service function is expediently set up to provide the arguments before the internal controller function is invoked and to receive the return values after said controller function is invoked. The service function may optionally be set up to file one or more return values at a predetermined address in the main memory, meaning that in particular a connected influencing device can access said value using mechanisms that are known per se.

Arguments and/or return values are expediently passed via a stack or heap such that the memory address of the particular variable changes dynamically. In this case, the values can be passed only via relative memory addresses that are not globally unique, since neither the start address nor the instantaneous allocation of the stack is known in advance, and thus the address can only be specified relative to the stack pointer. Since the service function is set up to supply the microprocessor with the executable code for value passing, correct memory addresses can be determined and the required values can be written to the corresponding memory at runtime.

Alternatively or additionally, arguments and/or return values may also be exchanged via a local register of the microprocessor of the controller. As a result of the service function supplying the executable code to the microprocessor, said microprocessor can itself write one or more required arguments into the corresponding local register or, after the internal controller function has been executed, can write one or more return values from the corresponding local registers into the main memory.

According to a preferred variant for supplying the internal controller function with arguments, executable code is contained in the service configuration, which code provides at least one value for at least one argument of the internal controller function in the controller. This approach has the advantage that only the executable code needs to be invoked in order to prepare the invocation of the internal controller function. This executable code may have been generated for the controller central processing unit (CPU) via a cross-compiler for example, using information about the structure of the program code of the controller (for example header files). In particular, the same cross-compiler via which the program code of the controller itself has also been generated can be used. Following the same principle, it is alternatively or additionally provided in another embodiment that the service configuration contains executable code which receives at least one return value of the internal controller function. Said return value could then be provided to a connected influencing device, for example.

In a preferred embodiment of the method for operating a controller, it is assumed that the service function is set up to invoke functions having predetermined patterns of arguments and/or return values. In practice, a pattern of this kind is understood to be the information usually comprised by a function declaration. The specification "double f(char, int, int)" describes, for example, a function f having a double-type return value which is to be supplied with three arguments, the first argument being a character and the second and third arguments each being an integer. The service function is now set up such that it is prepared for the invocation of functions having particular patterns of arguments and/or return values. In that case, the service configuration denotes the internal controller function (or optionally a plurality of controller functions) by specifying the predetermined pattern and by specifying the start address of the internal controller function. These specifications clearly establish which internal controller function or which internal controller functions is or are invoked when the service function is invoked.

The service function of the controller can be executed for example cyclically in a fixed time frame, in which case it is placed in the real-time operating system (usually used in the controller) as a timer task, or is invoked in the context of such a timer task, in addition to other functions. It is also possible that the service function is executed acyclically; said function can be driven by an external event, for example an event in the technical process to which the controller is connected via the I/O interface. It is therefore quite conceivable that a particular service function is invoked only very rarely or only once.

When it is stated that the service configuration is detected in the controller, this means that the correspondence of service function and internal controller function or internal controller functions contained in the service configuration is identified (i.e. meaningfully detected) by an evaluation function implemented in the controller, and the correspondence contained in the service configuration needs to be converted, in place of the service function, into the corresponding invocation of the internal controller function. The service configuration can be provided on the controller simply by the service configuration being saved in a memory region of the controller provided for this purpose. However, the service configuration could also be provided externally.

In a preferred embodiment, the controller is connected to an influencing device via an interface, and the service configuration is transferred from the influencing device to the controller via the interface and is saved on the controller. In an alternative embodiment, although the controller is also connected to an influencing device via an interface and the service configuration is transferred from the influencing device to the controller via the interface, in this case the service configuration is not saved in a permanent manner, but rather the service configuration is immediately detected in the controller and, in place of the service function, an invocation of the internal controller function corresponding to the service configuration is immediately implemented. It could thus be possible that the corresponding information from the service configuration does not first need to be read out and detected for every invocation of a service function in order to invoke the assigned internal controller function as a service functionality of the service function. For example, it could be ensured that the service configuration is read out and detected again only when the service configuration has changed, which could be signaled by setting a particular flag on the controller, for example.

It is preferably provided that at least one memory location is specified in the service configuration, in which memory location at least one value for one argument or a plurality of arguments of the internal controller function is stored in the controller and/or in which at least one return value of the internal controller function is stored in the controller. This measure ensures that the service function knows where it receives an argument, or of course also a plurality of arguments, for the internal controller function that is to be invoked, or even a plurality of internal controller functions to be invoked, and where it files, if applicable, a return value, or of course also a plurality of return values, of the internal controller function in the controller for further use. If the service configuration originates from a connected influencing device, it is of course also known on the influencing device where the arguments of the internal controller function are to be filed in the controller and where, if applicable, return values of an internal controller function are to be found in the controller, if said values are needed for a further calculation, for example.

In a development of the above-mentioned method, the memory location for an argument of the internal controller function is monitored and the internal controller function is invoked by the value for the argument stored in the memory location only if an actual value for the argument has been written to the memory location. This allows automatic synchronization with an external bypass process, monitoring of the memory location not necessarily meaning that only the change in the content of the memory location is detected, but rather that the write action in the memory location can also be disabled irrespective of whether or not the content of the memory location has changed during the write action.

An embodiment of the method described thus far that is also important for external bypassing is that the controller is connected to an influencing device via an interface and the controller transfers the return value of the internal controller function to the influencing device via the interface and/or the influencing device reads out the return value of the internal controller function from the controller via the interface. In this way, not only can the invocation of an internal controller function be prompted by the influencing device, but also the result of the invocation of the internal controller function can be processed in the influencing device. An influencing device used in this manner is therefore the location of a swapped functionality or a bypass functionality. Said influencing device may be an influencing device that is different from the first-mentioned influencing device via which the service configuration is transferred to the controller. However, the functionalities may also be implemented in a single influencing device, but this is clearly not imperative.

Another feature for an advantageous development of the method, in particular in respect of bypassing, is characterized in that the controller is connected to an influencing device via an interface, and program code having at least one influencing device function is stored in the influencing device, the service configuration comprises the invocation of an influencing device function and, when the corresponding service function is invoked, the controller signals the invocation of the influencing device function to the influencing device via the interface and the influencing device executes the influencing device function. In this way, the controller can invoke, or trigger, an influencing device function in the influencing device in a targeted manner, and therefore the controller and the influencing device are closely interrelated in terms of function and time.

In relation to the method having the influencing device function, it has proven advantageous if a memory location is specified in the service configuration, in which memory location a value for an argument of the influencing device function is stored in the controller and/or in which a return value of the influencing device function is stored in the controller. This functionality is independent of the invocation of the internal controller function and ensures that the influencing device function is reliably supplied with the correct arguments, and further ensures that the result of the calculation of the influencing device function is made available at the correct place on the controller.

In the aforementioned context, a synchronization is in turn established between the controller and the influencing device by the memory location for an argument of the influencing device function being monitored by the influencing device via the interface, and the influencing device function being invoked by the value for the argument stored in the memory location only if an actual value for the argument has been written to the memory location.

In another exemplary embodiment, the present invention provides a controller set up for external bypassing, the controller being connected to a technical process via an I/O interface, program code having internal controller functions being stored on the controller, the program code being equipped with at least one service function, and, when the program code is executed, the controller outputting control signals to the technical process via the I/O interface and receiving state variables of the technical process as signals via the I/O interface. Finally, the controller set up for external bypassing is characterized in that a service configuration for the service function is provided on the controller, in that the service configuration is detected in the controller during operation of the controller and a service functionality is executed in accordance with the service configuration when the service function is invoked, the service configuration denoting an internal controller function which is executed as a service functionality of the corresponding service function, meaning that providing the service configuration on the controller has a flexible effect on the connected technical process. The controller is further characterized in that the above-described method is carried out accordingly on the controller when the controller is in operation.

Figure 1:
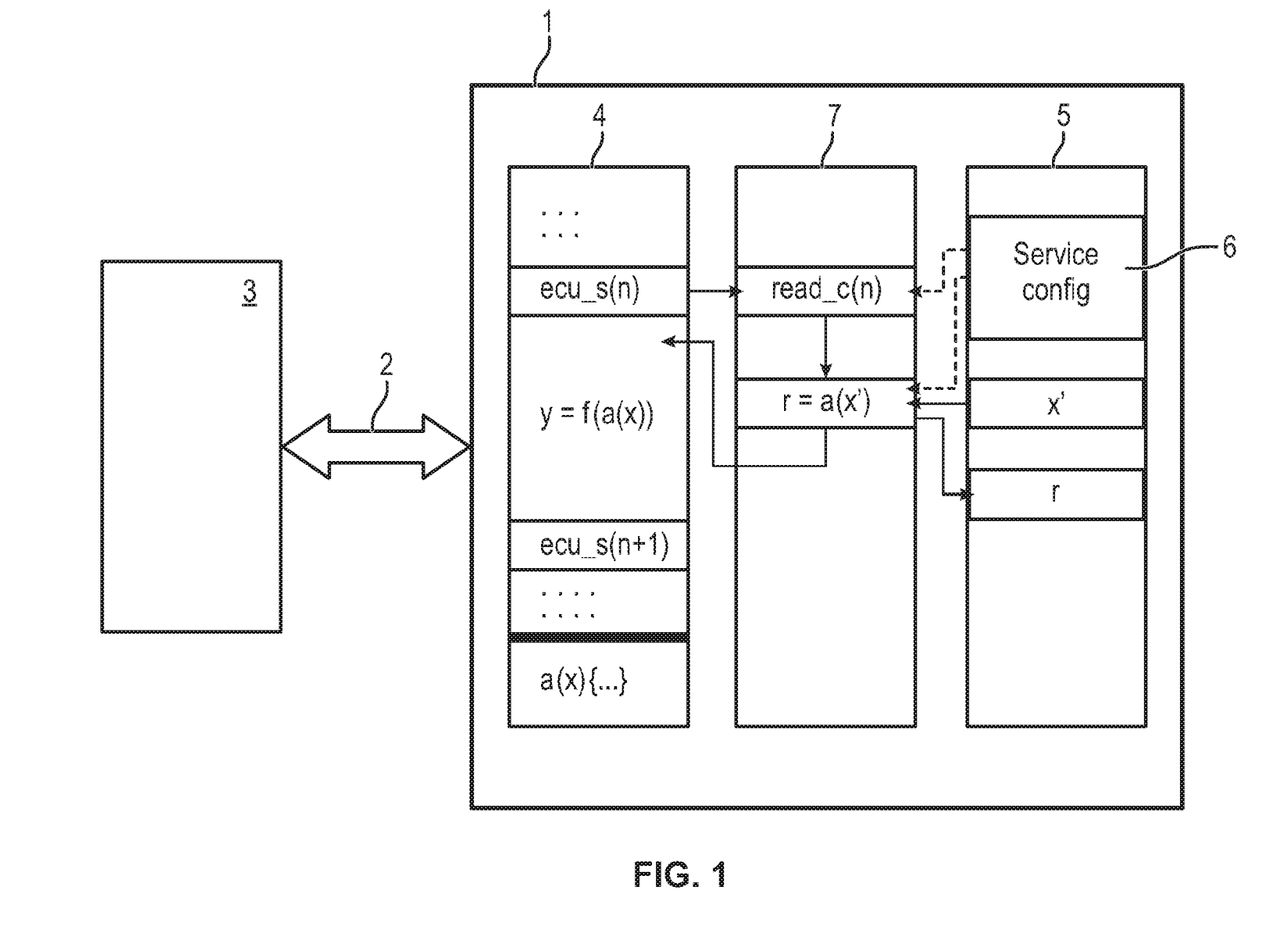
FIG. 1 shows a first embodiment of a controller set up for external bypassing, and a method for operating a controller of this kind.

FIG. 1 shows the typical situation for the use of a controller 1, the controller 1 being connected to a technical process 3 via an I/O interface 2. Via the I/O interface 2, the controller 1 is in permanent operative connection with the technical process 3, said controller outputting manipulated variables to actuators within the technical process 3 and thus actively influencing the technical process 3, and the controller 1 receiving measurement data from the technical process 3 via sensors via the I/O interface 2 and allowing said measurement data to be taken into account in the calculation of new manipulated variables, for example. The controller comprises at least one microprocessor having one or more cores, which may also be implemented on a programmable logic chip as an IP (intellectual property) core.

Program code 4 having internal controller functions is stored on the controller 1, the controller functions f( ) and a( ) being shown in each of FIGS. 1 to 4. In addition, the program code 4 is equipped with service functions, the service functions being denoted in each of FIGS. 1 to 4 by "ecu_s(n)" and "ecu_s(n+1)".

An original functionality f( ) is defined in the program code 4 of the controller 1, the calculation of which leads to the result y. The argument of the function f( ) is provided by the internal controller function a( ), which in turn uses the argument x. Said controller function f( ), which is permanently implemented in the program code, is surrounded by the service functions ecu_s(n) and ecu_s(n+1). Said service functions ecu_s(n), ecu_s(n+1) surrounding the controller function f( ) basically make it possible to bypass the controller function f( ).

The service functions ecu_s( ) in the program code 4 of the controller 1 are above all used to implement the planned influence of the controller 1 via bypassing. In the embodiments shown here, it is now made possible for even internal controller functions a( ) to be able to be invoked by virtually any service function ecu_s( ), this being made possible in particular also via external bypassing.

For this purpose, a service configuration 6 is provided on the controller 1, for example in the random access memory (RAM) 5 of the controller 1, and said service configuration 6 is meaningfully detected in the controller 1 by an algorithm such that a service functionality is executed in accordance with the service configuration 6 when the service function ecu_s( ) is invoked, the service configuration 6 denoting at least one internal controller function a( ) which is executed as a service functionality of the corresponding service function ecu_s( ). In the embodiments shown, the service configuration 6 contains the information that the service function ecu_s(n) invokes the internal controller function a(x), it being intended for the invocation to be carried out with the argument x' in the present case. The service configuration 6 therefore contains a correspondence list which can assign any internal controller function a_i( ) or even a plurality of any internal controller functions a_i( ) to a service function ecu_s(i), meaning that one or more of any internal controller functions a( ) can be invoked in the program code 4 of the controller 1 at virtually all points at which a service function ecu_s( ) is provided.

In the embodiment shown, the service configuration 6 is detected by reading out the corresponding correspondence from the service configuration 6 to the service function ecu_s(n). In the embodiments, said reading out of the correspondence from the service configuration is denoted as "read c(n)". In that case, reading out the service configuration 6 leads to the result that the internal controller function a(x) is to be executed with the argument x'. The processes (e.g. read n) associated with reading out the service configuration 6 and the conversion of the information contained in the service configuration 6 into statements (e.g. r=a(x')) are shown in the drawings in the bypassing services 7 in each case. In the embodiments according to FIGS. 1 to 4, the program code 4 is and the bypassing services 7 are located in the flash memory of the controller 1, and the service configuration 6 and exchange memory are implemented in the RAM 5.

Figure 2:
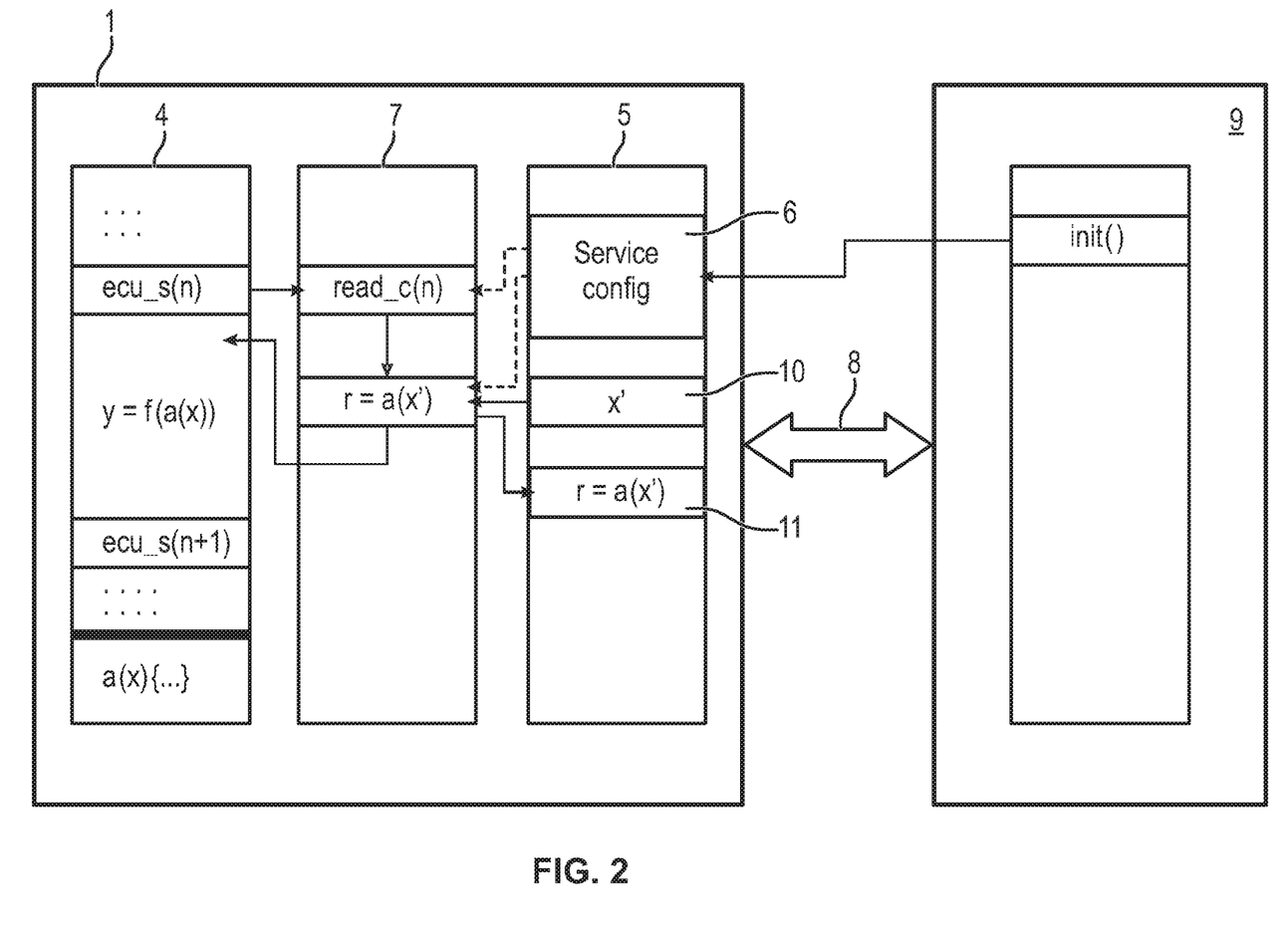
FIG. 2 again shows a controller set up for external bypassing, this time comprising a connected influencing device.
Figure 3:
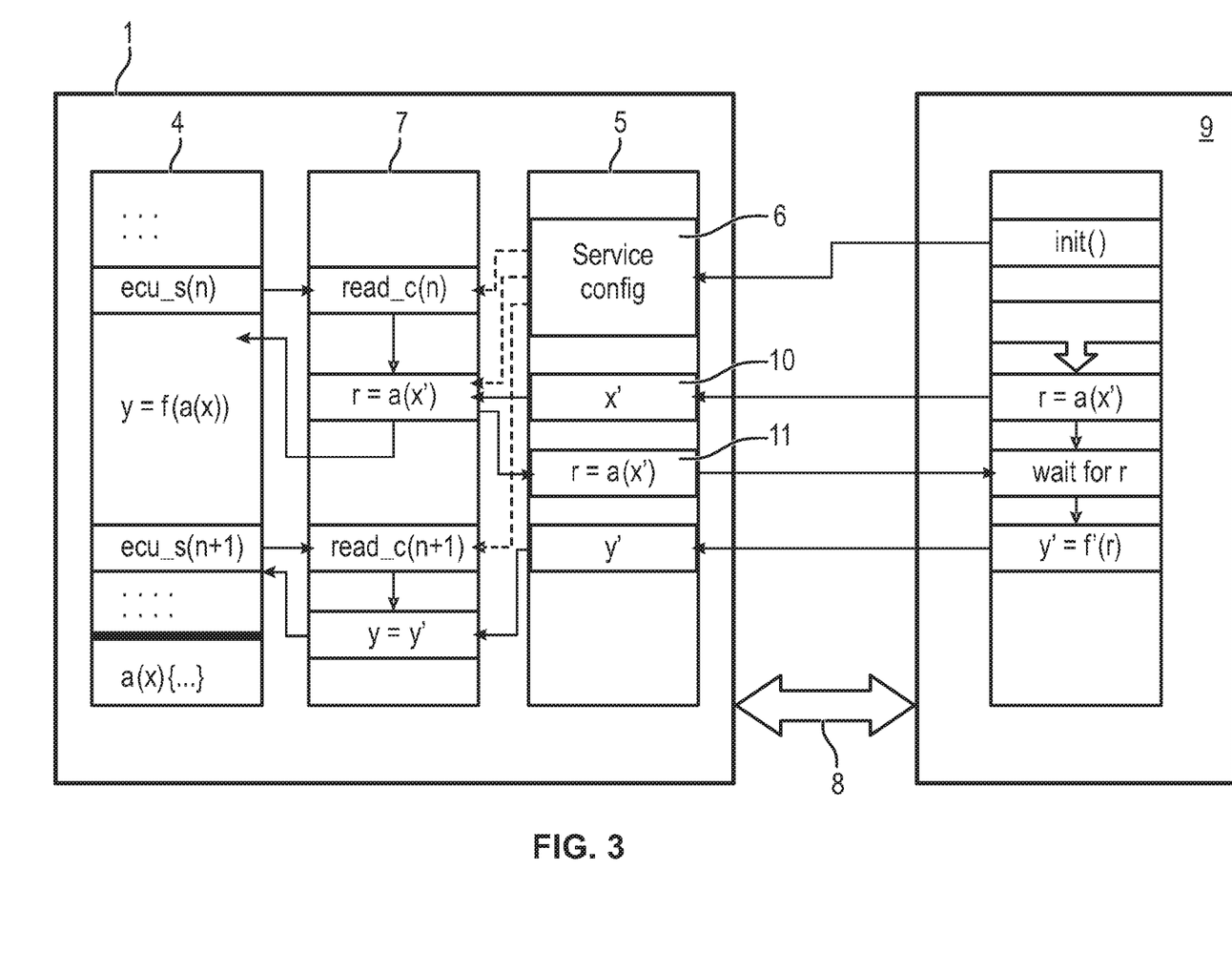
FIG. 3 shows a controller set up for external bypassing, comprising a connected influencing device and a complete sequence for the bypassing.
Figure 4:
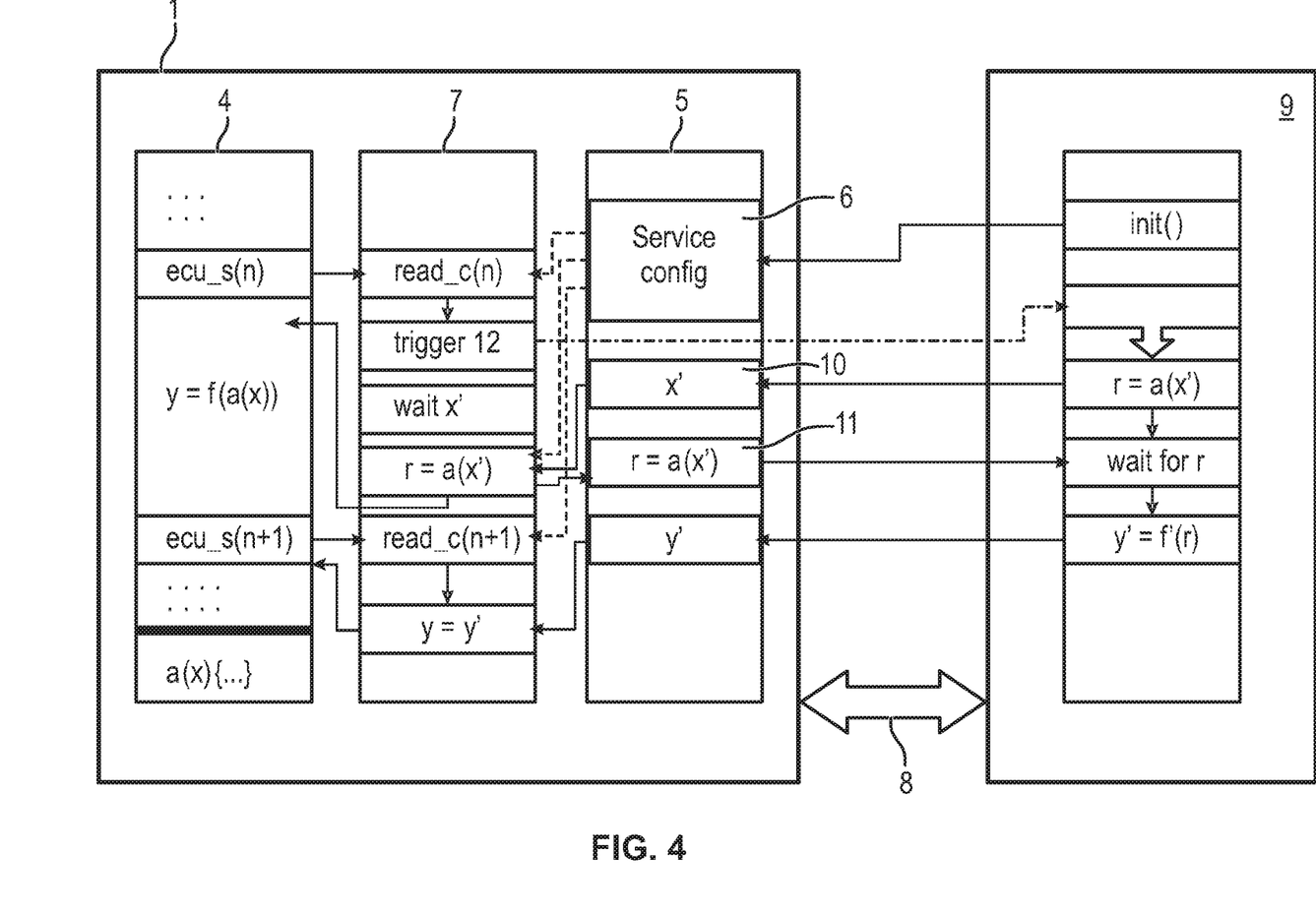
FIG. 4 shows the embodiment according to FIG. 3 having further synchronization for sequence control on the controller.

FIGS. 2 to 4 no longer show the physical process 3, which can still be seen in FIG. 1. Instead, FIGS. 2 to 4 each show an interface 8, via which the controller 1 is connected to an influencing device 9.

It can be seen in FIG. 2 that the service configuration 6 is transferred from the influencing device 9 to the controller 1 via the interface 8 and is saved on the controller 1; this process is indicated by an arrow. Ideally, this happens during the initialization of the controller 1 by the influencing device 9, which is indicated by the function "init( )".

FIGS. 2 to 4 further show that the service configuration 6 also specifies memory locations 10, 11 in which a value x' for an argument of the internal controller function a( ) is stored in the controller 1, and where a return value r of the internal controller function a( ) is stored in the controller 1. Said memory locations 10, 11 can be used in particular as exchange memories, via which the controller 1 and the influencing device 9 can exchange arguments x' and results r of the internal controller function a( ).

In the methods implemented in the controllers 1, in the context of the bypass services 7, the memory location 10 for an argument x' of the internal controller function a( ) is monitored and the internal controller function a( ) is invoked by the value for the argument x' stored in the memory location 10 only if an actual value for the argument x' has been written to the memory location 10. It is thus ensured that the internal controller function a( ) is always calculated using an actual argument x'.

FIGS. 3 and 4 show the expansion of the method described thus far, such that complete bypassing is achieved via the external influencing device 9, by invoking the internal controller function a( ). This involves the controller 1 being connected to the influencing device 9 via the interface 8, and the controller 1 transferring the return value r of the internal controller function a( ) to the influencing device 9 via the interface 8. Alternatively, the influencing device 9 can read out the return value r of the internal controller function a( ) from the controller 1 via the interface 8. In the method shown, the internal controller function a( ) is calculated using the argument x', which is stored in the memory location 10.

In FIGS. 3 and 4, the influencing device 9 comprises program code having an influencing device function f'( ). The influencing device function f'( ) is intended to modify the calculation of the original controller function f( ) available in the program code 4 in the controller 1. While the calculation of the internal controller function f( ) leads to the result y, the calculation of the influencing device function f'( ) leads to the modified result value y'.

In this connection, FIG. 4 shows that the service configuration 6 comprises the invocation 12 ("trigger") of the influencing device function f'( ) and, when the corresponding service function, in this case the service function ecu_s(n), is invoked, the controller 1 signals the invocation 12 of the influencing device function f'( ) to the influencing device 9 via the interface 8, whereupon the influencing device 9 executes the influencing device function f'( ). It can thus be ensured that the controller 1 can actively trigger influencing device functions f'( ) on the influencing device 9.

In the method according to FIGS. 3 and 4, carrying out the bypassing also includes a memory location 11 being specified in the service configuration 6, in which memory location a value for an argument r of the influencing device function f'( ) is stored in the controller 1 and in which a return value y' of the influencing device function f'( ) is stored in the controller 1. Finally, in the two methods shown, the value y, which is the result of the original controller function f( ) is replaced by the modified value y', which results from the calculation of the influencing device function f'( ) as a result of which the bypassing of the original controller function f( ) is completed.

In the method presented, it is further provided that the memory location 11 for the argument r of the influencing device function f is monitored by the influencing device 9 via the interface 8, and the influencing device function f is invoked by the value for the argument r stored in the memory location 11 only if an actual value for the argument r has been written to the memory location 11; this is indicated in the drawings by the method step "wait for r". As a result, the calculation of the influencing device function f can be initiated in a virtually event-driven manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a controller, wherein program code having internal controller functions is stored on the controller, wherein the program code is equipped with at least one service function, and wherein a service configuration for the at least one service function is provided on the controller, wherein the method comprises:

detecting, in the controller, the service configuration; and
executing, by the controller, a service functionality in accordance with the service configuration when the at least one service function is invoked;
wherein the service configuration denotes at least one internal controller function which is executed as a service functionality of the at least one service function;
wherein the at least one service function, via the service configuration, provides at least one value for at least one argument of the at least one internal controller function in the controller and/or receives at least one return value of the at least one internal controller function;
wherein the controller is connected to an influencing device via an interface, and the controller transfers the at least one return value of the at least one internal controller function to the influencing device via the interface, and/or the influencing device reads out the return value of the at least one internal controller function from the controller via the interface.

2. The method according to claim 1, wherein executable code is contained in the service configuration, wherein the executable code facilitates providing the at least one value for the at least one argument of the at least one internal controller function in the controller and/or receiving the at least one return value of the internal controller function.

3. The method according to claim 1, wherein the at least one service function is set up to invoke functions having predetermined patterns of arguments and/or return values, wherein the service configuration denotes the at least one internal controller function by specifying the predetermined pattern and by specifying the start address of the at least one internal controller function.

4. The method according to claim 1, wherein the service configuration is transferred from the influencing device to the controller via the interface and is saved on the controller.

5. The method according to claim 1, wherein at least one memory location is specified in the service configuration, wherein the at least one value for the at least one argument of the at least one internal controller function is stored in the at least one memory location and/or wherein at least one return value of the at least one internal controller function is stored in the at least one memory location.

6. The method according to claim 5, wherein a respective memory location for respective argument of the at least one internal controller function is monitored, and the at least one internal controller function is invoked with the value for the respective argument stored in the respective memory location based on an actual value for the argument having been written to the respective memory location.

7. The method according to claim 1, wherein program code having at least one influencing device function is stored in the influencing device; and
wherein the service configuration comprises the invocation of an influencing device function and, when the at least one service function is invoked, the controller signals the invocation of the influencing device function to the influencing device via the interface and the influencing device executes the influencing device function.

8. The method according to claim 7, wherein a memory location in the controller is specified in the service configuration, wherein a value for an argument of the influencing device function is stored in the memory location in the controller and/or a return value of the influencing device function is stored in the memory location in the controller.

9. The method according to claim 8, wherein the memory location for the argument of the influencing device function is monitored by the influencing device via the interface, and the influencing device function is invoked with the value for the argument stored in the memory location based on an actual value for the argument having been written to the memory location.

10. A controller for external bypassing, the controller being connected to a technical process via an I/O interface, wherein the controller comprises a one or more non-transitory computer-readable mediums with program code stored thereon, the program code having internal controller functions, and the program code being equipped with at least one service function, wherein execution of the program code facilitates performance of the following:
outputting control signals to the technical process via the I/O interface and receiving state variables of the technical process as signals via the I/O interface;
detecting a service configuration for the at least one service function during operation of the controller; and
executing a service functionality in accordance with the service configuration when the at least one service function is invoked;
wherein the service configuration denotes at least one internal controller function which is executed as a service functionality of the at least one service function;
wherein the at least one service function, via the service configuration, provides at least one value for at least one argument of the at least one internal controller function in the controller and/or receives at least one return value of the at least one internal controller function;
wherein the controller is connected to an influencing device via an interface, and wherein execution of the program code further facilitates performance of the following:
bypassing one or more controller internal functions based on an input received from the influencing device via the interface;
receiving an argument from the influencing device via the interface for use by an internal controller function; and/or
providing a return value from an internal controller function to the influencing device via the interface.

11. A method for operating a controller, wherein program code having internal controller functions is stored on the controller, wherein the program code is equipped with at least one service function, and wherein a service configuration for the at least one service function is provided on the controller, wherein the method comprises:
detecting, in the controller, the service configuration; and
executing, by the controller, a service functionality in accordance with the service configuration when the at least one service function is invoked;
wherein the service configuration denotes at least one internal controller function which is executed as a service functionality of the at least one service function;
wherein the at least one service function, via the service configuration, provides at least one value for at least one argument of the at least one internal controller function in the controller and/or receives at least one return value of the at least one internal controller function;
wherein the controller is connected to an influencing device via an interface, and wherein the method further comprises: bypassing, by the controller, one or more controller internal functions based on an input received from the influencing device via the interface.

12. The method according to claim 11, wherein the at least one service function is set up to invoke functions having predetermined patterns of arguments and/or return values, wherein the service configuration denotes the at least one internal controller function by specifying the predetermined pattern and by specifying the start address of the at least one internal controller function.

13. The method according to claim 11, wherein program code having at least one influencing device function is stored in the influencing device;

wherein the service configuration comprises the invocation of an influencing device function and, when the at least one service function is invoked, the controller signals the invocation of the influencing device function to the influencing device via the interface and the influencing device executes the influencing device function.

14. A method for operating a controller, wherein program code having internal controller functions is stored on the controller, wherein the program code is equipped with at least one service function, and wherein a service configuration for the at least one service function is provided on the controller, wherein the method comprises:

detecting, in the controller, the service configuration; and executing, by the controller, a service functionality in accordance with the service configuration when the at least one service function is invoked;

wherein the service configuration denotes at least one internal controller function which is executed as a service functionality of the at least one service function;

wherein the at least one service function, via the service configuration, provides at least one value for at least one argument of the at least one internal controller function in the controller and/or receives at least one return value of the at least one internal controller function;

wherein the controller is connected to an influencing device via an interface, and wherein the method further comprises: receiving an argument from the influencing device via the interface for use by an internal controller function.

15. The method according to claim 11, wherein the at least one service function is set up to invoke functions having predetermined patterns of arguments and/or return values, wherein the service configuration denotes the at least one internal controller function by specifying the predetermined pattern and by specifying the start address of the at least one internal controller function.

16. The method according to claim 11, wherein program code having at least one influencing device function is stored in the influencing device;

wherein the service configuration comprises the invocation of an influencing device function and, when the at least one service function is invoked, the controller signals the invocation of the influencing device function to the influencing device via the interface and the influencing device executes the influencing device function.

* * * * *